Patented July 11, 1944

2,353,544

UNITED STATES PATENT OFFICE 2,353,544

RESTRAINER COMPOSITION FOR DEVELOPMENT OF PHOTOGRAPHS

Pio Caccia, Chicago, Ill.

No Drawing. Application September 24, 1941, Serial No. 412,104

2 Claims. (Cl. 95—88)

The invention relates to a composition of matter for use as a so-called restrainer in the development of photographs, and it also relates to a process for producing the composition.

The invention has as an object the provision of a new methylaminparaphenolsulphonate composition having characteristics adapting it for use as a restrainer in the development of photographs, and which when so used adds softness and clarity, and, in general, improves the color and tone of photographs developed in a solution containing the composition.

The invention has as another object the provision of a new organic compound for use as a restrainer adapted to minimize depression of the image densities and to serve as an anti-fogging agent when added to a photographic alkaline developing bath.

Still another object of the invention is the provision of a novel process for producing a methylaminparaphenolsulphonate composition having characteristics especially adapting it for use as a restrainer in the development of photographs.

The preferred method of carrying out the invention comprises two preliminary or secondary processes by which 1:4 paraphenol sulphonic acid and sulphate of methylamine are respectively produced in suitable quantities and having the requisite characteristics adapting them for use in a final or major process resulting in the new methylaminparaphenolsulphonate composition.

The reagents for the above reaction, namely calcium 1:4 paraphenolsulphonate and methylamine sulfate, may be prepared by well-known methods. For the purposes of the present invention, however, I find it particularly convenient to prepare the calcium 1:4 paraphenolsulphonate in the following manner: 10.0 parts by weight of phenol crystals are mixed with 10.5 parts by weight of concentrated sulfuric acid, and the mixture is maintained at a temperature of approximately 95° centigrade for from eight to ten hours, with occasional stirring. Calcium oxide is then added to the mixture in limited quantities, the mixture being stirred and the oxide added until the product takes on a deep violet color. Calcium carbonate is next added to neutralize the mixture which takes on a deep red brick color when neutrality is reached. The mixture now consists of a solution of the desired calcium salt of 1:4 paraphenolsulphonic acid and a precipitate of calcium sulphate. The solution is filtered off and the precipitate is discarded.

While the methylamine sulphate may be prepared in any desirable manner, I find it convenient to make this substance by the well known Hofmann synthesis. This consists in dissolving 59 grams of acetamide in a liter of water and adding 159.84 grams of bromine and then thoroughly stirring the admixture. A solution containing 56.10 grams of potassium hydroxide is next added to the admixture. From the following equations representing the course of the reaction, it will be apparent that one mole of each of the above-indicated reagents is used:

$$CH_3CONH_2 + Br_2 = CH_3CONHBr + HBr$$
$$CH_3CONHBr + KOH = CH_3NH_2 + CO_2 + KBr$$

The admixture is distilled and the methylamine thereby volatilized is collected in a solution of diluted sulfuric acid to obtain the methylamine sulphate, $(CH_3NH_2)_2 \cdot H_2SO_4$.

Methylaminparaphenolsulphonate is formed by adding the methylamine sulphate solution to the solution of calcium 1:4 paraphenolsulphonate, with vigorous stirring.

The reaction which takes place is as follows:

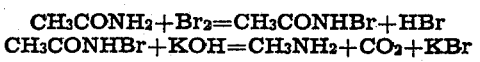

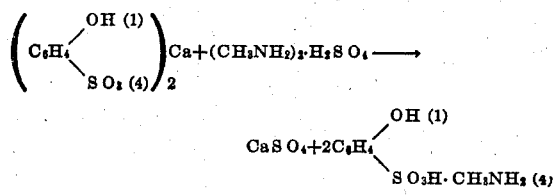

My new compound, methylaminparaphenolsulphonate, has the formula

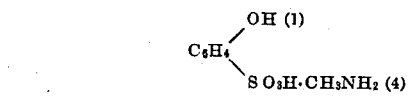

It remains in solution in the reaction mixture of the above-indicated equation as long as the temperature is 80° C. or higher; but precipitates below 80° C. The reaction mixture therefore is filtered at a temperature above 80° C. in order to remove the calcium sulphate formed in the reaction. The filtrate is then concentrated by evaporation, and thereafter is cooled to secure the precipitation of methylaminparaphenolsulphonate in crystalline form. The methylaminparaphenolsulphonate crystals may be dissolved in water to form the restrainer solution of the present invention.

Photographic developing baths as used hitherto generally consist of an alkaline solution containing developer agents such as hydroquinone, together with Elon, sodium sulphite, sodium hydrosulphite, sodium carbonate, and also includes potassium bromide which acts as a restraining agent. Potassium iodide is usually also added to check the action of the potassium bromide. The new composition is preferably used in the developing bath as a substitute for the potassium bromide ingredient since its use as such substitute results in the elimination of or a greatly reduced depression of the image densities of the photographs developed therein. The new composition also functions as an antifogging agent since its use as a substitute for potassium bromide takes away all of the silver that has not been affected by the exposure of the film or plate. The foregoing characteristics of an alkaline developing solution containing the new product as a constituent results from the product combining with the silver of the film to form a salt having the final formula

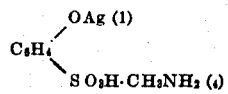

which silver salt is soluble, but soluble to a lesser degree than the silver bromide resulting from use of potassium bromide as a restrainer ingredient and while I do not desire to be limited to any particular theory, I am of the opinion that such diminished solubility tends to increase the softness of the photographic images. The use of the organic restrainer methylaminparaphenolsulphonate as a substitute for potassium bromide also adds to the fog removing qualities of the bath.

Having thus described my invention, it is obvious that various modifications may be made in the same without departing from the spirit of my invention; hence, I do not wish to be understood as limiting myself to the exact proportions, details and uses recited herein.

What I claim as new and desire to secure by Letters Patent is:

1. A photographic developing bath comprising an aqueous solution of a developer, an alkaline substance, and a restrainer comprising methylaminparaphenolsulphonate.

2. The process of restraining the development of a photographic image to improve the color and tone of the developed photograph and add softness and clarity thereto, which comprises the steps of including methylaminparaphenolsulphonate in a developing bath, and developing an exposed photographic film therein.

PIO CACCIA.